US011947312B2

(12) United States Patent
Go et al.

(10) Patent No.: US 11,947,312 B2
(45) Date of Patent: Apr. 2, 2024

(54) COOLING STRUCTURE FOR REGULATION BLADE OF DEVELOPING DEVICE

(71) Applicant: Hewlett-Packard Development Company, L.P., Spring, TX (US)

(72) Inventors: Minguk Go, Seongnam-si (KR); Horyul Lee, Seongnam-si (KR); Yoshihiko Ichikawa, Seongnam-si (KR); Yunkyu Shim, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/027,618

(22) PCT Filed: Jun. 25, 2021

(86) PCT No.: PCT/US2021/039038
§ 371 (c)(1),
(2) Date: Mar. 21, 2023

(87) PCT Pub. No.: WO2022/081216
PCT Pub. Date: Apr. 21, 2022

(65) Prior Publication Data

US 2023/0393523 A1 Dec. 7, 2023

(30) Foreign Application Priority Data

Oct. 14, 2020 (KR) ........................ 10-2020-0132342

(51) Int. Cl.
*G03G 21/00* (2006.01)
*G03G 15/08* (2006.01)
*G03G 21/20* (2006.01)

(52) U.S. Cl.
CPC ....... *G03G 21/206* (2013.01); *G03G 15/0812* (2013.01); *G03G 15/0815* (2013.01); *G03G 2221/1645* (2013.01)

(58) Field of Classification Search
CPC ............. G03G 21/206; G03G 15/0812; G03G 15/0896; G03G 2221/1645
USPC ........................................... 399/92, 274, 284
See application file for complete search history.

(56) References Cited

U.S. PATENT DOCUMENTS 10,534,314 B1 * 1/2020 Stafford ............... G03G 21/206
2001/0031151 A1 * 10/2001 Kakimoto .......... G03G 15/0812 399/92
2005/0074255 A1 4/2005 Awaya
2007/0116489 A1 5/2007 Kim
2008/0232851 A1 9/2008 Park et al.
(Continued)

FOREIGN PATENT DOCUMENTS

CN 1967411 A 5/2007
CN 109976129 A 7/2019
(Continued)

*Primary Examiner* — Robert B Beatty
(74) *Attorney, Agent, or Firm* — Foley & Lardner LLP

(57) ABSTRACT

An example developing device includes a developing roller, a regulation blade to regulate a thickness of a toner layer attached to an outer circumference of the developing roller, a blade bracket for supporting the regulation blade, and an inner duct including an air supply port and extending in a longitudinal direction of the developing roller to form a flow path of air to cool the blade bracket.

13 Claims, 6 Drawing Sheets

(56) References Cited

U.S. PATENT DOCUMENTS

| | | | | |
|---|---|---|---|---|
| 2009/0060560 | A1* | 3/2009 | Tamura | G03G 15/0815 399/92 |
| 2009/0269098 | A1* | 10/2009 | Mori | G03G 15/0891 399/94 |
| 2012/0045243 | A1 | 2/2012 | Nishikawa et al. | |
| 2013/0343786 | A1* | 12/2013 | Kashimoto | G03G 15/0812 399/274 |
| 2017/0017200 | A1 | 1/2017 | Oya | |
| 2019/0196369 | A1 | 6/2019 | Sakamoto et al. | |
| 2020/0272072 | A1* | 8/2020 | Morimoto | G03G 21/10 |

FOREIGN PATENT DOCUMENTS

| | | | | | |
|---|---|---|---|---|---|
| EP | 1429204 | A1 | * | 6/2004 | G03G 15/0812 |
| EP | 2290466 | A2 | | 3/2011 | |
| JP | 07248673 | A | * | 9/1995 | G03G 15/0812 |
| JP | 2002351213 | A | * | 12/2002 | G03G 15/0812 |
| JP | 2003005512 | A | * | 1/2003 | G03G 15/0812 |
| JP | 2008-302548 | A | | 12/2008 | |
| JP | 2009-169308 | A | | 7/2009 | |
| JP | 5600970 | B2 | | 10/2014 | |
| KR | 10-2004-0085184 | A | | 10/2004 | |
| KR | 10-2005-0113038 | A | | 12/2005 | |

* cited by examiner

COOLING STRUCTURE FOR REGULATION BLADE OF DEVELOPING DEVICE

CROSS-REFERENCE TO RELATED APPLICATIONS

This application is filed under 35 U.S.C. § 371 as a National Stage of PCT International Application No. PCT/US2021/039038, filed Jun. 25, 2021, which claims priority to Korean Patent Application No. 10-2020-0132342, filed Oct. 14, 2020, which are incorporated by reference herein in their entireties.

BACKGROUND

An image forming apparatus using electrophotography supplies toner to an electrostatic latent image formed on a photoconductor to form a visible toner image on the photoconductor, transfers the toner image to a print medium, and fuses the transferred toner image to the print medium, thereby printing an image on the print medium.

A developing device accommodates toner. The developing device includes a developing roller opposite to the photoconductor. The toner may be attached to an outer circumference of the developing roller. By applying a developing bias voltage to the developing roller, toner is transferred to an electrostatic latent image from the outer circumference of the developing roller to develop the electrostatic latent image into a visible toner image. The developing device includes a regulation blade that regulates an amount of toner attached to the developing roller. The regulation blade is to form a toner layer of a uniform thickness on the outer circumference of the developing roller.

DETAILED DESCRIPTION OF EXAMPLES

Figure 1:
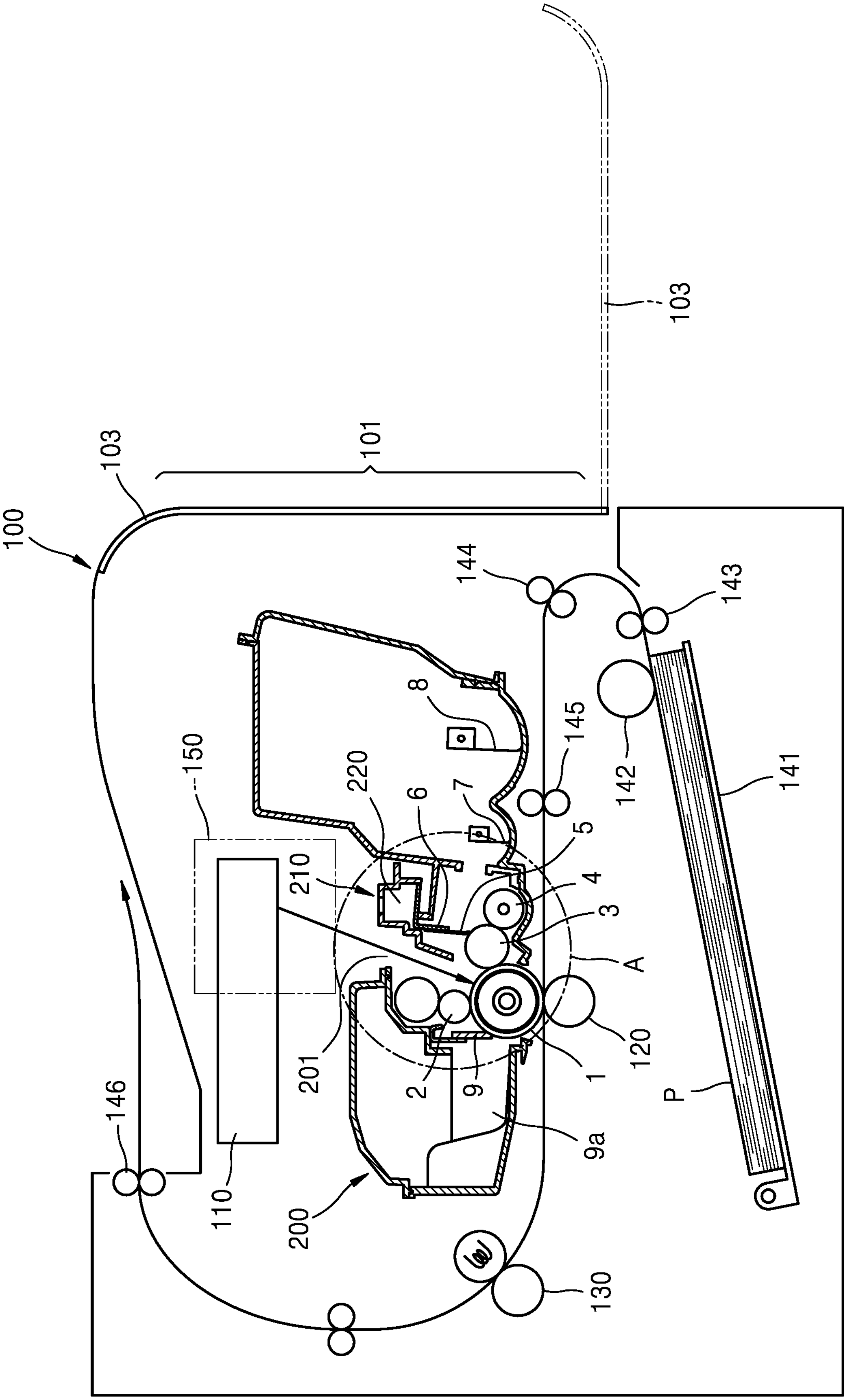
FIG. 1 is a schematic diagram of an electrophotographic image forming apparatus according to an example.

An electrophotographic image forming apparatus includes a developing device. The developing device supplies toner contained therein to an electrostatic latent image formed on a photoconductor to develop the electrostatic latent image into a visible toner image. The developing device includes a developing roller facing the photoconductor and a regulation blade. The regulation blade regulates an amount of toner adhered to an outer circumference of the developing roller so as to form a toner layer having a uniform thickness on the outer circumference of the developing roller.

Heat is generated inside the image forming apparatus during an image forming process. Sources of the heat include fixing heat generated by a fuser, frictional heat generated by contact between the developing roller and a sealing member, and the like. The temperature of the regulation blade may increase due to the heat generated during the image forming process. The higher the speed of the image forming apparatus, the greater the amount of heat generated. An increase in the temperature of the regulation blade may cause toner to stick to the regulation blade. When toner sticks to the regulation blade, the thickness of a toner layer formed on the outer circumference of the developing roller may be non-uniform, thus causing printing defects such as uneven density of an image.

The inside of the image forming apparatus, including the regulation blade, may be cooled by supplying air into the image forming apparatus using a blower. However, it is not easy to effectively cool the regulation blade by a cooling method using a blower. For effective cooling, a method of increasing air volume around the developing device by increasing a blowing capacity of the blower may be considered. However, when the blowing capacity is increased, the inside of the image forming apparatus may be contaminated due to toner scattering. In addition, a noise level during the operation of the blower may increase, thus degrading product quality and user experience. Also, the price and size of a blower generally increases in proportion to a blowing capacity thereof which therefore increases the price and size of the image forming apparatus.

According to an example, a regulation blade is supported by a blade bracket. An inner duct extending in a longitudinal direction of the developing roller to form an air flow path for cooling the blade bracket is provided inside the developing device. The blade bracket may be cooled by supplying air to the inner duct through the air supply port. The regulation blade and the blade bracket are formed of a metal material. Because the regulation blade is supported by the blade bracket, the regulation blade may be cooled by cooling the blade bracket. According to an example, the regulation blade may be effectively cooled without increasing a blowing capacity of the blower. In addition, the regulation blade may be effectively cooled while avoiding side effects such as toner scattering, increased noise, or an increase in costs. Hereinafter, examples of a developing device and an image forming apparatus employing the same will be described.

FIG. 1 is a schematic diagram of an electrophotographic image forming apparatus according to an example.

Referring to FIG. 1, the image forming apparatus may include a developing device 200 and a blower 150. The developing device 200 may include a developing roller 3, a regulation blade 5 for regulating a thickness of a toner layer attached to an outer circumference of the developing roller 3, a blade bracket 6 on which the regulation blade 5 is supported, and an inner duct 220 having an air supply port 221 (*see* FIG. 3) and extending in a longitudinal direction L (see FIG. 2) of the developing roller 4 to form an air flow path for cooling the blade bracket 6.

The developing device 200 may be detachably attached to a main body 100. The main body 100 may include an exposure device 110, a transfer roller 120, and a fuser 130. The main body 100 may be provided with a medium transport structure for loading thereon a print medium P on which an image is to be formed and for transporting the print medium P. The developing device 200 accommodates a developer, for example, toner. The developing device 200 may include a photosensitive drum 1 and a developing roller 3. The developing device 200 is a consumable that is replaceable in a case in which a lifetime thereof ends. The case in which the lifetime of the developing device 200 ends may be understood to include a case in which the lifetime of components of the developing device 200, e.g., the photosensitive drum 1 or the developing roller 3, ends, a case in which the toner contained in the developing device 200 is exhausted, and the like. The main body 100 is provided with an opening 101 to provide a path through which the developing device 200 may be installed or removed. A door 103 opens or closes the opening 101.

When a charging bias voltage is applied to a charging roller 2, a surface of the photosensitive drum 1 is charged with a uniform surface potential. The exposure device 110 forms an electrostatic latent image on the photosensitive drum 1 by emitting light modulated to correspond to image information to the photosensitive drum 1. The toner is supplied to a surface of the developing roller 3 by agitators 7 and 8 and a supply roller 4. The toner adhered to the surface of the developing roller 3 is regulated by the regulation blade 5 into a toner layer having a uniform thickness. As the developing roller 3 is rotated, the toner layer reaches a developing area in which the photosensitive drum 1 and the developing roller 3 face each other. The toner is attached to the electrostatic latent image on the photosensitive drum 1 by a developing bias voltage applied to the developing roller 3. Therefore, a visible toner image is formed on the photosensitive drum 1. Each sheet of print media P is picked up from a tray 141 by a pickup roller 142, and transported by transfer rollers 143, 144, and 145 to a transfer area where the photosensitive drum 1 and the transfer roller 120 are opposed. The toner image is transferred to the print medium P by a transfer bias voltage applied to the transfer roller 120. The fuser 130 applies heat and pressure to the toner image transferred to the print medium P to fix the toner image on the print medium P. The print medium P passing through the fuser 130 is discharged to the outside of the main body 100 by a discharge roller 146. Waste toner remaining on the surface of the photosensitive drum 1 after the transferring of the toner image is removed by a cleaning blade 9 and stored in a waste toner container 9*a*.

During the image forming process, heat is generated inside the main body 100. The source of heat may include fixing heat generated by the fuser 130, frictional heat generated by contact of internal members of the developing device 200, and the like. In an example, the image forming apparatus includes a cooling structure.

Figure 2:
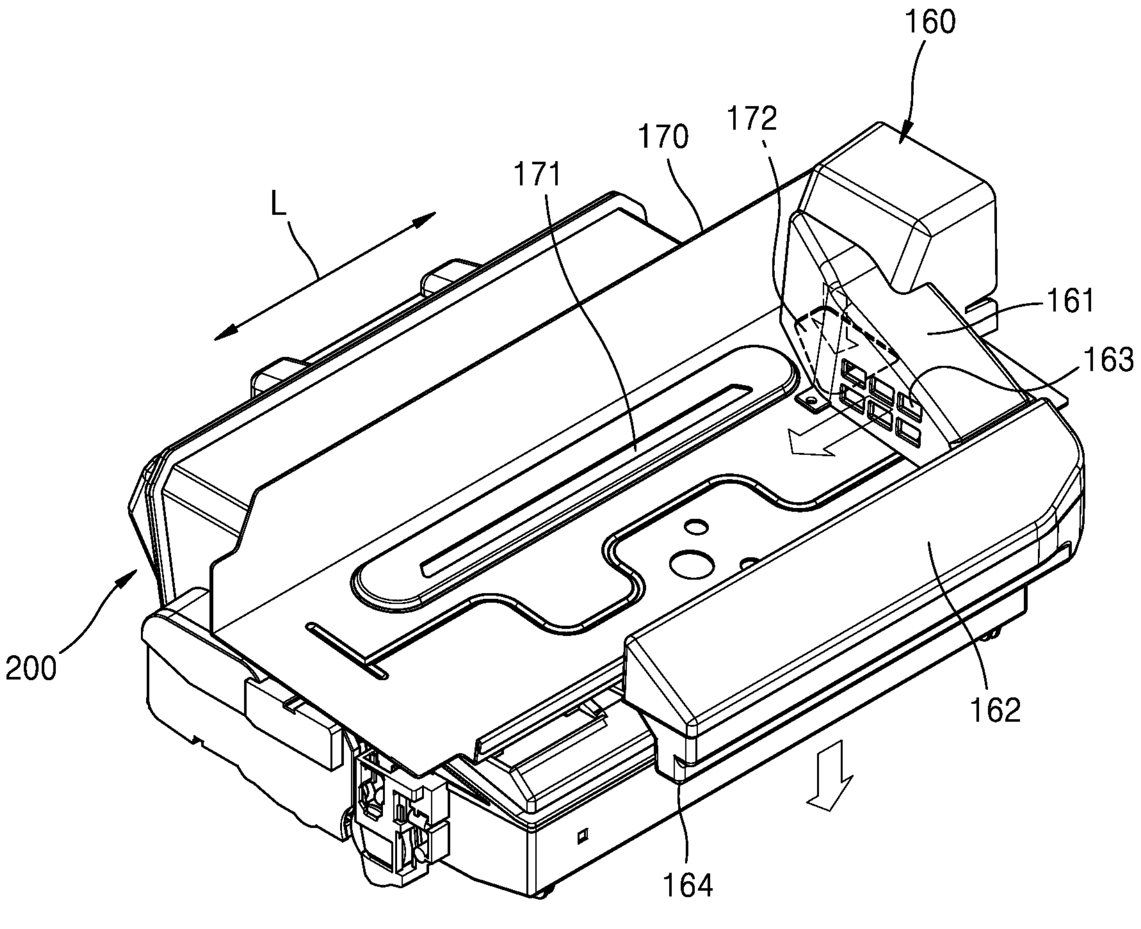
FIG. 2 is a perspective view of a cooling structure according to an example.
Figure 3:
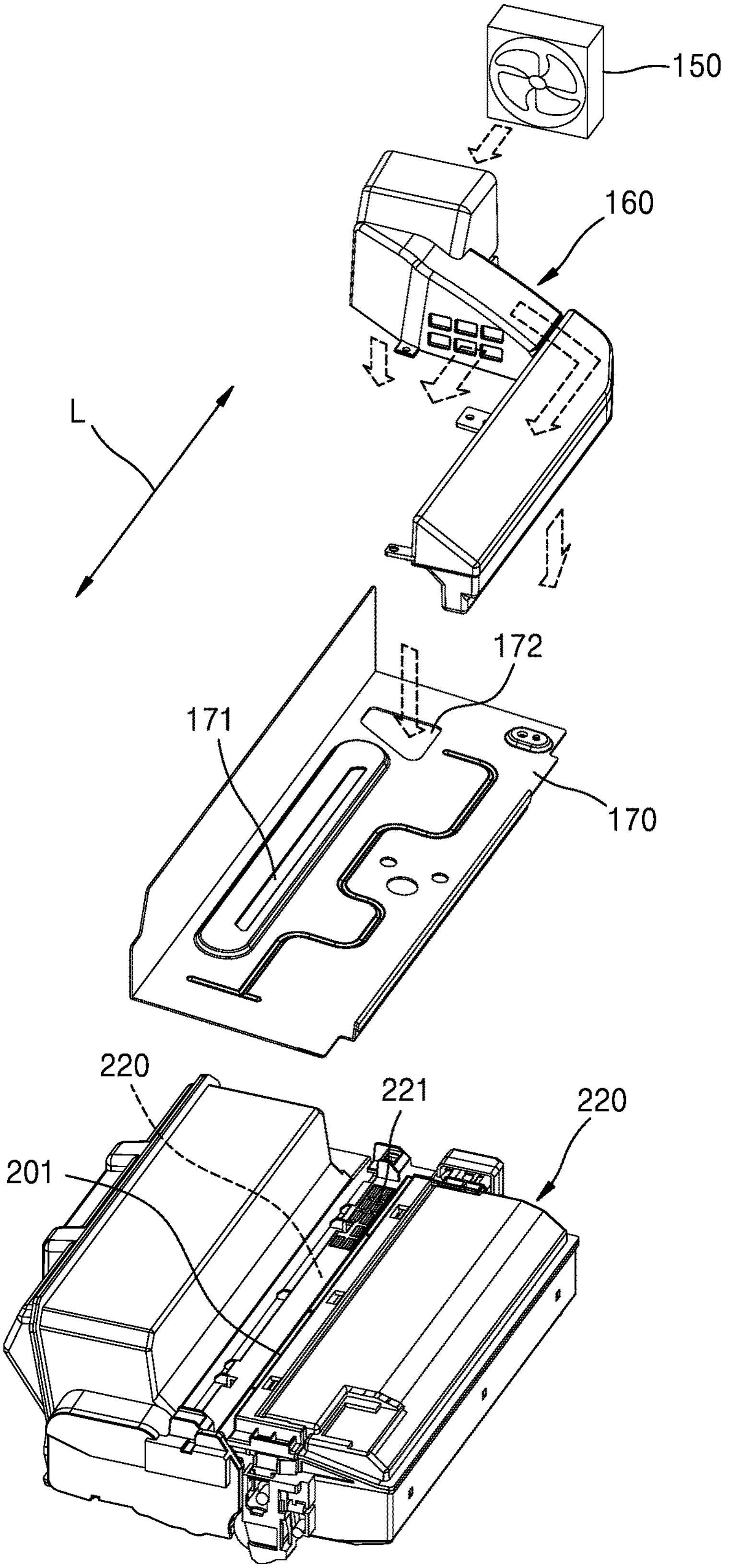
FIG. 3 is an exploded perspective view of the cooling structure of FIG. 2 according to an example.

FIG. 2 is a perspective view of a cooling structure according to an example. FIG. 3 is an exploded perspective view of the cooling structure of FIG. 2 according to an example.

Referring to FIGS. 2 and 3, a main body 100 is provided with a blower 150 for supplying external air into the main body 100. The blower 150 and an air supply port 221 of an inner duct 220 are connected by a main duct 160. The blower 150 may be provided on one side of the main body 100 in a width direction, e.g., a longitudinal direction L of a developing roller 3. Air introduced into the main body 100 through an inlet (not shown) provided in the main body 100 by the blower 150 is supplied to various positions inside the main body 100 through the main duct 160 and is discharged to the outside of the main body 100 through an outlet (not shown) together with heat from the inside of the main body 100. The main duct 160 may include, for example, a first portion 161 extending along a side portion of a developing device 200 and a second portion 162 extending from the first portion 161 in the longitudinal direction L of the developing roller 3.

A protective plate 170 may be positioned between the developing device 200 and an exposure device 110. The protective plate 170 prevents the exposure device 110 from being exposed to the outside when the developing device 200 is removed from the main body 100. The protective plate 170 may function as a heat shield plate so that heat, such as heat from a fuser 130, may not be directly transferred to the exposure device 110. The protective plate 170 may form a lower wall of the main duct 160. The protective plate 170 may be provided with a first vent 172 opposite to the air supply port 221 so that air flowing through the main duct 160 may be supplied to the developing device 200 through the air supply port 221. The protective plate 170 may include an opening 171 through which exposure light emitted from the exposure device 110 to expose the photosensitive drum 1 may pass. The opening 171 may extend in the longitudinal direction L of the developing roller 3. The main duct 160 may be provided with a second vent 163 for supplying air between the protective plate 170 and the exposure device 110. For example, the second vent 163 may be provided in the first portion 161 of the main duct 160. The second vent 163 may be open in the longitudinal direction L of the developing roller 3 to cool the exposure device 110. Air supplied between the protective plate 170 and the exposure device 110 through the second vent 163 may be supplied toward the developing device 200 under the protective plate 170 through the opening 171. The second portion 162 may be provided with a third vent 164 that is open toward the fuser 130 to disperse fixing heat emitted from the fuser 130.

The example developing device 200 has a structure for cooling a regulation blade 5 to prevent an increase in temperature of the regulation blade due to heat generated during an image forming process.

Figure 4:
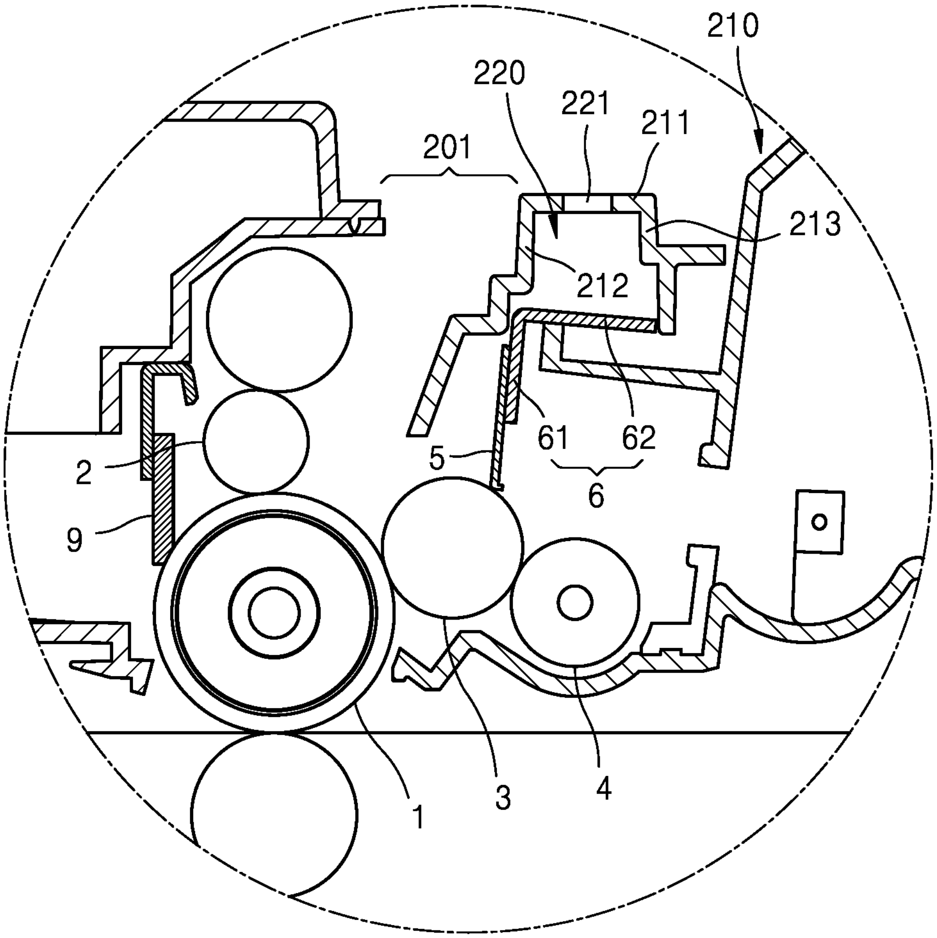
FIG. 4 is a view of part A of FIG. 1 according to an example.

FIG. 4 is a view of part A of FIG. 1 according to an example.

Referring to FIGS. 1 and 4, the image forming apparatus may include the developing device 200 and the blower 150. The developing device 200 may include the developing roller 3, the regulation blade 5 for regulating a thickness of a toner layer attached to the outer circumference of the developing roller 3, the blade bracket 6 on which the regulation blade 5 is supported, and the inner duct 220 having the air supply port 221 and extending in the longitudinal direction L of the developing roller 4 to form an air flow path for cooling the blade bracket 6.

The components of the developing device 200, including the photosensitive drum 1 and the developing roller 3, are supported by a housing 210. The housing 210 may be a combination of two or more members. One end of the regulation blade 5 may be in elastic contact with the outer circumference of the developing roller 3. The regulation blade 5 may be supported on the blade bracket 6. The blade bracket 6 may be supported by the housing 210. The regulation blade 5 and the blade bracket 6 generally extend in the longitudinal direction L of the developing roller 3. The blade bracket 6 may include a support 61 on which the regulation blade 5 is supported, and an extension 62 that is bent from the support 61 and exposed to the inside of the inner duct 220. The regulation blade 5 may be coupled to the support 61 by, for example, a screw connection method, a welding method, or the like. The extension 62 is bent at about 90 degrees from the support 61 and supported by the housing 210 of the developing device 200. The extension 62 is exposed inside the inner duct 220. Air flowing through the inner duct 220 cools the extension 62. The regulation blade 5 and the blade bracket 6 may be formed of a metal plate. For example, the regulation blade 5 may be formed of a stainless steel thin plate and the blade bracket 6 may be formed of a cold drawn steel sheet. Because metal has high thermal conductivity, the regulation blade 5 may be cooled by cooling the extension 62 of the blade bracket 6.

The inner duct 220 may be provided inside the housing 210 and extend in the longitudinal direction L of the developing roller 3. The inner duct 220 includes the air supply port 221 through which air may be introduced from the blower 150. The air supply port 221 may be provided on one side of the inner duct 220 in the longitudinal direction L. The air supply port 221 may be provided on a side at which the blower 150 is located. The air supply port 221 may face the first vent 172 of the protective plate 170. The air supply port 221 may be provided in an upper wall 211 of the housing 210. Air supplied to the main duct 160 by the blower 150 may be supplied to the inner duct 220 through the first vent 172 and the air supply port 221. The extension 62 of the blade bracket 6 may form a wall facing the air supply port 221 of the inner duct 220. Because air introduced into the inner duct 220 through the air supply port 221 directly contacts the extension 62 of the blade bracket 6 opposite to the air supply port 221, the extension 62 may be cooled effectively.

An exposure slit 201 may be provided on the upper wall 211 of the housing 210 to form a path of exposure light for exposing the photosensitive drum 1. The exposure slit 201 may extend in the longitudinal direction L of the developing roller 3. The exposure slit 201 faces the opening 171 of the protective plate 170. Air supplied between the protective plate 170 and the exposure device 110 through the second vent 163 may be supplied into the developing device 200 through the opening 171 and the exposure slit 201.

For example, the inner duct 220 may be formed by the upper wall 211 of the housing 210, a first sidewall 212 extending from one end of the exposure slit 201, a second sidewall 213 extending from the upper wall 211 of the housing 210 to face the first sidewall 212, and the extension 62 of the blade bracket 6 facing the upper wall 211 of the housing 210. Having this example arrangement, the extension 62 of the blade bracket 6 may be exposed inside the inner duct 220 and may be cooled by air flowing through the inner duct 220. In addition, because the extension 62 may form one wall of the inner duct 220, the number of components for forming the inner duct 220 may be reduced.

A size and shape of the air supply port 221 may affect a flow rate of air supplied to the inner duct 220 and flow characteristics of the air flowing through the inner duct 220.

Figure 5:
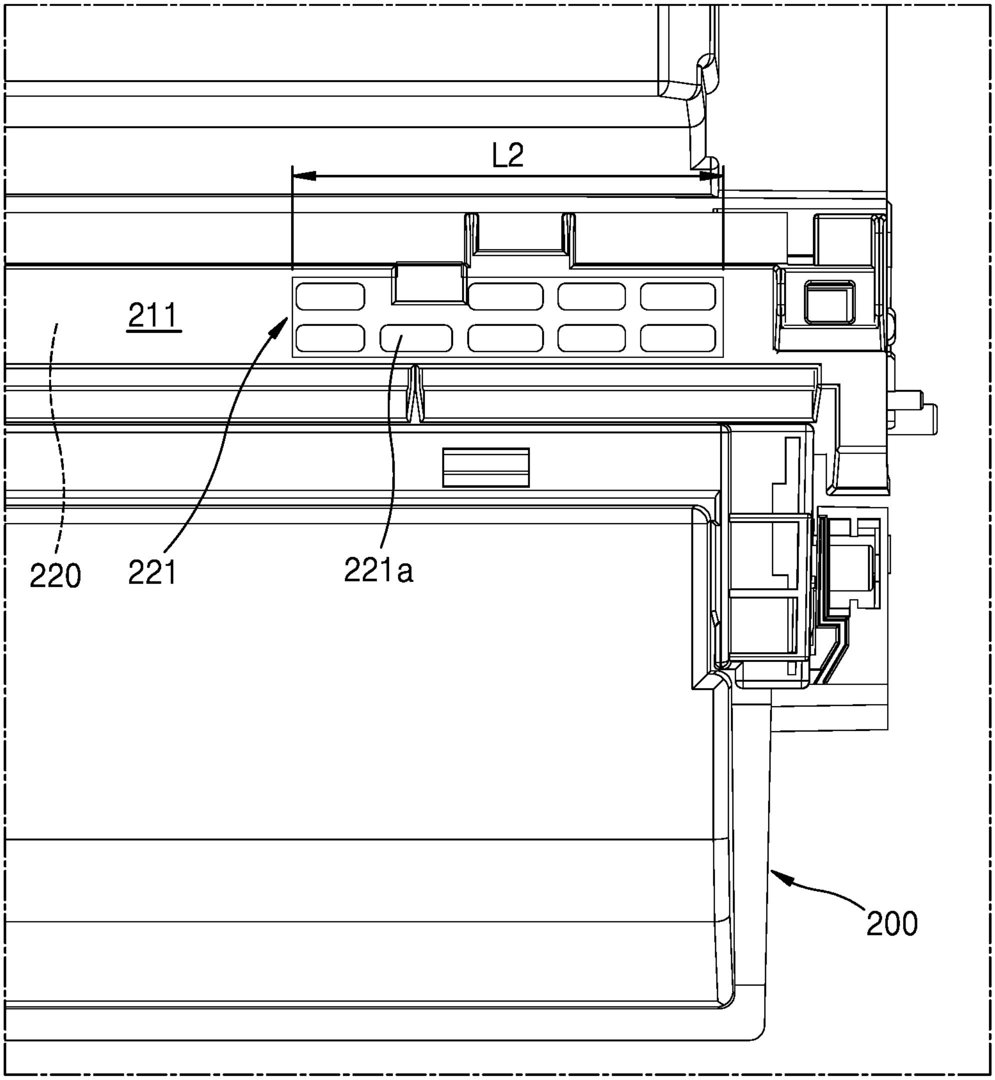
FIG. 5 is a plan view of an air supply port according to an example.

FIG. 5 is a plan view of an air supply port according to an example.

Referring to FIG. 5, the air supply port 221 may extend in the longitudinal direction L from one side of the inner duct 220. A length L2 of the air supply port 221 may affect the flow rate of air flowing through the inner duct 220. The length L2 of the air supply port 221 may be 25 to 50% of the length of the inner duct 220. When the length L2 of the air supply port 221 is less than 25% of the length of the inner duct 220, the amount of air supplied to the inner duct 220 may be insufficient and thus make it difficult to obtain a sufficient air flow rate and cooling effect. When the length L2 of the air supply port 221 is greater than 50% of the length of the inner duct 220, the flow rate of air flowing through the inner duct 220 may be low and thus make it difficult to obtain a sufficient cooling effect. By setting the length L2 of the air supply port 221 to 25 to 50% of the length of the inner duct 220, the flow rate of air flowing through the inner duct 220 may be optimized without increasing the blowing capacity of the blower 150.

The air supply port 221 may include a plurality of slits 221*a*. An opening ratio of the air supply port 221 may be determined such that foreign substances are not introduced into the inner duct 220 through the air supply port 221. The opening ratio of the air supply port 221 refers to a ratio of the area of the plurality of slits 221*a* to the area of a region in which the air supply port 221 is formed. The amount of air supplied to the inner duct 220 may be insufficient when the opening ratio is too small, and foreign substances may flow into the inner duct 220 when the opening ratio is too large. According to an example, the opening ratio of the air supply port 221 may be about 30 to 70%. When the opening ratio of the air supply port 221 is less than 30%, it may be difficult to supply a sufficient amount of air to the inner duct 220. When the opening ratio of the air supply port 221 is greater than 70%, sizes of the slits 221*a* of the air supply port 221 increase and thus foreign substances may enter the inner duct 220. The shapes and sizes of the plurality of slits 221*a* need not necessarily be the same and may be determined such that the opening ratio of the air supply port 221 satisfies about 30 to 70% and foreign substances do not enter the inner duct 220.

Table 1 below shows a result of measuring a flow rate of air inside the inner duct 220 versus a ratio of the length L2 of the air supply port 221 to the length of the inner duct 220 when the opening ratio of the air supply port 221 is 65%. Table 1 below shows that when the ratio of the length L2 of the air supply port 221 to the length of the inner duct 220 is greater than 50%, the flow rate of air inside the inner duct 220 sharply decreases.

TABLE 1

| | Ratio (%) of length of air supply port to length of inner duct | | |
|---|---|---|---|
| | 100% | 50% | 25% |
| flow rate (m/s) | 0.12 | 0.40 | 0.45 |

An example process of cooling the regulation blade 5 will be described below. Air introduced into the main body 100 by the blower 150 may be supplied to the developing device 200 through the main duct 160. Air may be introduced into the developing device 200 in two ways to cool the regulation blade Air flowing through the inside of the main duct 160 may be supplied to the inner duct 220 through the first vent 172 and the air supply port 221. Air flowing through the inside of the main duct 160 may be supplied between the protective plate 170 and the exposure device 110 through the second vent 163, and supplied into the developing device 200 through the opening 171 and the exposure slit 201 in the upper wall 211 of the housing 210.

Figure 6:
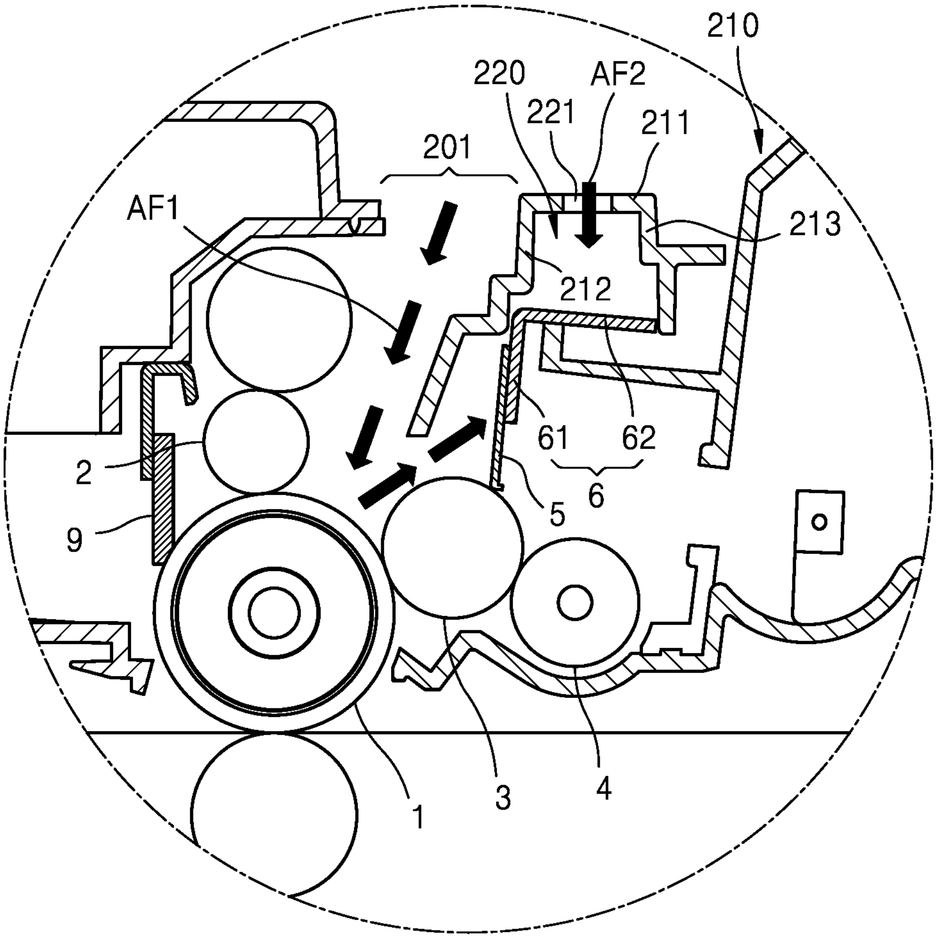
FIG. 6 is a view showing a flow of air inside a developing device according to an example.

FIG. 6 is a view showing a flow of air inside a developing device according to an example.

Referring to FIG. 6, air AF1 introduced into the developing device 200 through the exposure slit 201 may be brought into contact with the regulation blade 5 to cool the regulation blade 5. In order to effectively cool the regulation blade 5, the flow rate and speed of the air AF1 flowing into the developing device 200 through the exposure slit 201 may be increased by increasing the blowing capacity of the blower 150. The air AF1 is in contact with toner attached to the outer circumference of the developing roller 3 inside the developing device 200. When the flux and flow rate of the air AF1 increases, the toner may scatter and leak to the outside of the developing device 200 through the exposure slit 201. The leaking toner may contaminate the inside of the main body 100. In addition, as a blowing capacity increases, the size of the blower 150 and a level of operating noise may increase.

According to an example, air AF2 may be supplied to the inner duct 220 to cool the blade bracket 6, thereby cooling the regulation blade 5 by using convection and conduction. The air AF2 supplied to the inner duct 220 through the air supply port 221 flows through the inner duct 220 in the longitudinal direction L, thus cooling the extension 62 of the blade bracket 6 by convection. The extension 62 is exposed to the air AF2 flowing through the inside of the inner duct 220. Because the extension 62 forms a wall facing the air supply port 221 of the inner duct 220, the extension 62 may be effectively exposed to the air AF2. In addition, because the inner duct 220 may be formed without adding components, costs of the developing device 200, which is a consumable, may be reduced. Heat of the regulation blade 5 may be transferred to the support 61 and the extension 62 of the blade bracket 6 by conduction, and may be transferred to the air AF2 flowing through the inner duct 220 and discharged to the outside of the developing device 200.

According to an example, the regulation blade 5 is directly cooled by the air AF1 supplied through the exposure slit 201. In addition, the blade bracket 6 on which the regulation blade 5 is supported is cooled by the air AF2 supplied through the inner duct 220, thereby additionally cooling the regulation blade 5 by convection and conduction. Accordingly, the regulation blade 5 may be effectively cooled without increasing the capacity of the blower 150. It is possible to prevent toner from sticking to the regulation blade 5 due to an increase in the temperature of the regulation blade 5, thereby preventing a degradation in image quality. Side effects such as an increase in costs, an increase in a noise level, and toner scattering due to an increase in the capacity of the blower 150 may be avoided. In addition, it is possible to prevent an excessive increase in the temperature of the regulation blade 5 and thus a high-speed image forming apparatus may be manufactured in a small size.

The air AF2 may flow through the extension 62 and thus the temperature of the air AF2 is lower than a surface temperature of the extension 62. When the speed of the air AF2 increases, a thickness of a boundary layer on a surface of the extension 62 increases and the difference in temperature between the surface of the extension 62 and the air AF2 increases, thus causing convection to occur actively. According to an example, by setting the length of the air supply port 221 within a range of 25 to 50% of the length of the inner duct 220, the flow rate of the air AF2 inside the inner duct 220 may be optimized without increasing the blowing capacity of the blower 150. In addition, by setting an opening ratio of the air supply port 221 to about 30 to 70%, it is possible to optimize the flow rate of the air AF2 and prevent foreign substances from entering the inner duct 220.

It should be understood that examples described herein should be considered in a descriptive sense only and not for purposes of limitation. Descriptions of features or aspects within each example should typically be considered as available for other similar features or aspects in other examples. While one or more examples have been described with reference to the figures, it will be understood by those of ordinary skill in the art that various changes in form and details may be made therein without departing from the spirit and scope as defined by the following claims.

What is claimed is:

1. A developing device comprising:

a developing roller;

a regulation blade to regulate a thickness of a toner layer attached to an outer circumference of the developing roller;

a blade bracket to support the regulation blade; and an inner duct including an air supply port and extending in a longitudinal direction of the developing roller to form a flow path of air to cool the blade bracket, wherein the air supply port is located at a side of the inner duct in the longitudinal direction, and wherein a length of the air supply port is in a range of 25 to 50% of a length of the inner duct.

2. The developing device of claim 1, wherein an opening ratio of the air supply port is in a range of 30 to 70%.

3. A developing device comprising:

a developing roller;

a regulation blade to regulate a thickness of a toner layer attached to an outer circumference of the developing roller;

a blade bracket to support the regulation blade; and an inner duct including an air supply port and extending in a longitudinal direction of the developing roller to form a flow path of air to cool the blade bracket, wherein the blade bracket comprises:

a support to support the regulation blade; and an extension bent from the support and exposed inside the inner duct.

4. The developing device of claim 3, wherein the extension forms a wall facing the air supply port of the inner duct.

5. The developing device of claim 3, further comprising:

a housing to support the developing roller; and a photosensitive drum supported by the housing to carry an electrostatic latent image, wherein an exposure slit is provided in an upper wall of the housing to form a path for exposure light exposing the photosensitive drum, and wherein the inner duct is formed by a first sidewall extending from the exposure slit, the upper wall of the housing, the extension of the blade bracket, and a second sidewall extending from the upper wall of the housing to face the first sidewall.

6. The developing device of claim 5, wherein the air supply port is located in the upper wall of the housing.

7. The developing device of claim 6, wherein the air supply port comprises a plurality of slits.

8. An image forming apparatus comprising:

a developing device comprising:

a developing roller;

a regulation blade to regulate a thickness of a toner layer attached to an outer circumference of the developing roller;

a blade bracket to support the regulation blade; and an inner duct including an air supply port and extending in a longitudinal direction of the developing roller to form a flow path of air for cooling the blade bracket;

a blower to supply air to the inner duct through the air supply port; and a main duct to connect the blower to the air supply port, wherein the air supply port is located at a side of the inner duct in the longitudinal direction, wherein a length of the air supply port is in a range of 25 to 50% of a length of the inner duct, and wherein an opening ratio of the air supply port is in a range of 30 to 70%.

9. The image forming apparatus of claim 8, wherein the developing device comprises:

a housing for supporting the developing roller; and a photosensitive drum supported by the housing to carry an electrostatic latent image, and wherein an exposure slit is provided together with the air supply port in an upper wall of the housing, the exposure slit to form a path for exposure light emitted from an exposure device to expose the photosensitive drum.

10. The image forming apparatus of claim 9, further comprising a protective plate positioned between the developing device and the exposure device to form a lower wall of the main duct, the protective plate comprising an opening through which the exposure light passes and a first vent facing the air supply port.

11. The image forming apparatus of claim 10, wherein the main duct comprises a second vent through which air is supplied between the protective plate and the exposure device.

12. The image forming apparatus of claim 9, wherein the blade bracket comprises:

a support to support the regulation blade; and an extension bent from the support to face the upper wall of the housing, and wherein the inner duct includes a first sidewall extending from an end of the exposure slit, the upper wall of the housing, the extension of the blade bracket, and a second sidewall extending from the upper wall of the housing to face the first sidewall.

13. The image forming apparatus of claim 12, wherein the air supply port comprises a plurality of slits.

* * * * *